May 25, 1926.
M. EGGUM
AGRICULTURAL IMPLEMENT
Filed Sept. 9, 1925
1,586,416
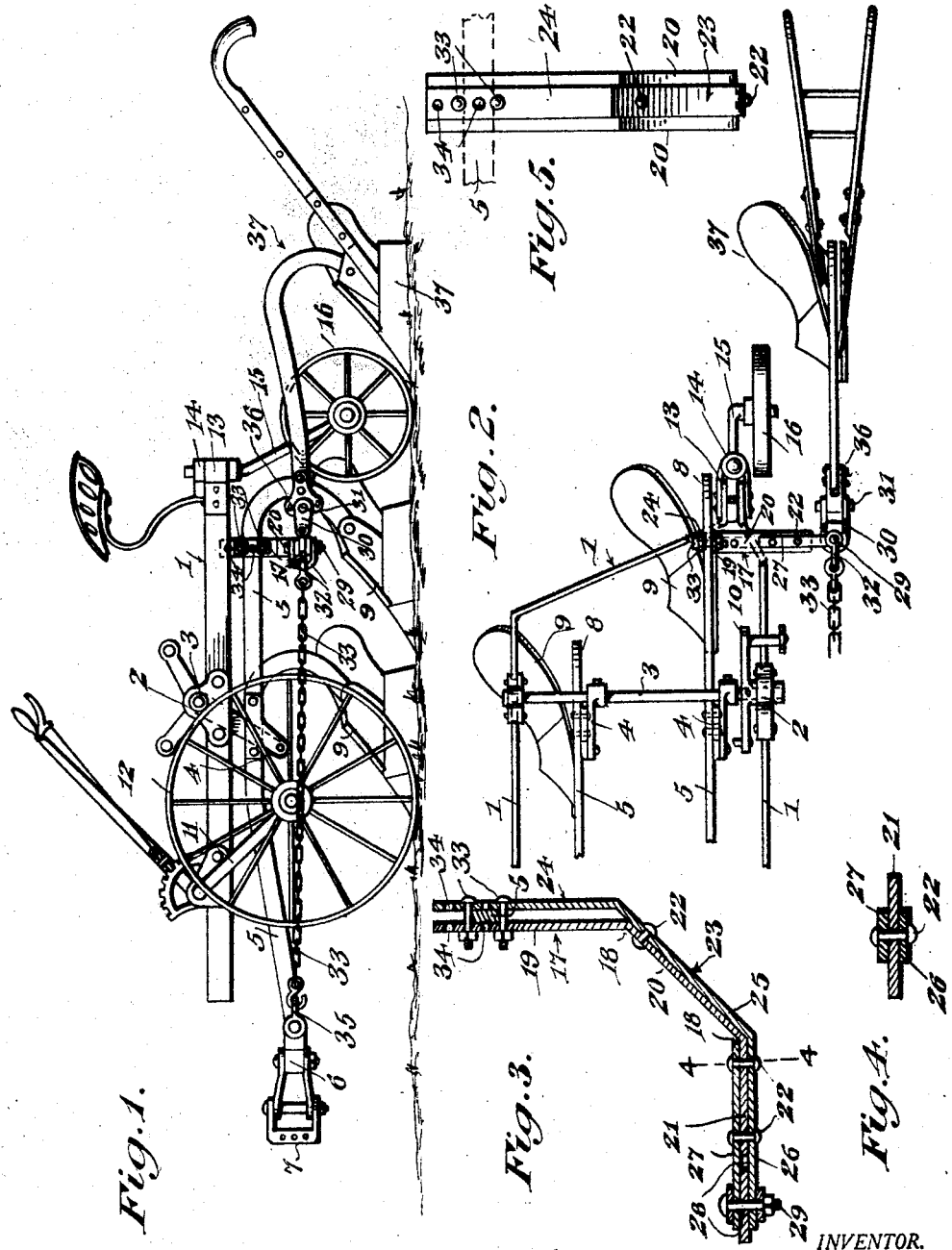
INVENTOR.
Martin Eggum,
BY
Geo. F. Kimmel ATTORNEY.

Patented May 25, 1926.

1,586,416

UNITED STATES PATENT OFFICE.

MARTIN EGGUM, OF RICHEY, MONTANA.

AGRICULTURAL IMPLEMENT.

Application filed September 9, 1925. Serial No. 55,292.

This invention relates to devices for connecting together agricultural implements and pertains particularly to a coupling device for connecting a walking plow to a sulky plow.

The primary object of this invention is the provision, in a manner as hereinafter set forth, of a connecting or coupling device adapted to be attached to a sulky plow in such a manner that a walking plow may be attached to the sulky to arrange the walking plow in the same relation with respect to the series of plows carried by the sulky as each of the series bears to one another.

Still another object of this invention is the provision, in a manner as hereinafter set forth, of a coupling device for the purpose above set forth which will be strong and sturdy, and will act to maintain the attached or walking plow in the proper position with respect to the plows carried by the sulky, under all conditions.

A further and final object of the invention is the provision, in a manner as hereinafter set forth, of an attaching bracket of the class described which is of simple construction, easily and quickly attachable or detachable, and positive and satisfactory in action.

The invention will be best understood from a consideration of the following detailed description taken in connection with the accompanying drawing forming a part of this specification, with the understanding that the invention is not confined to any strict conformity with the showing of the drawing but may be changed and modified so long as such changes and modifications mark no material departure from the salient features of the invention as expressed in the appended claims.

In the drawing:—

Figure 1 shows in side elevation a sulky plow and a walking plow attached thereto by means of the device embodying this invention.

Figure 2 is a top plan view of the rear portion of the sulky plow and of the walking plow, showing the device embodying this invention connecting the two plows together and in top plan view.

Figure 3 is a longitudinal sectional view through the connecting brackets embodying this invention.

Figure 4 is a section taken upon the line 4—4 of Figure 3 and,

Figure 5 is a rear view of the bracket embodying this invention.

Referring now to the drawing in detail wherein like numerals of reference indicate corresponding parts throughout the several views, there is indicated by the numeral 1 the frame of a sulky plow.

Carried upon the plates 2 which are secured to the sides of the frame 1, is a transversely extending shaft 3 to which shaft 3 arms 4 are secured as shown in Figure 2. These arms normally extend downwardly from the shaft 3 and have pivotally secured to their lower ends the plow beams 5. These plow beams 5 extend forwardly to a common head 6 to which a clevis 7 is pivotally attached for connection with a tractor or power means. The rear ends of the beams 5 are curved downwardly as indicated at 8 and carry at their lower ends the plows 9. As is clearly shown the plows 9 are in staggered relation.

The bracket 2 has pivotally attached thereto a foot lever 10, which is attached to the shaft 3 and by which the operator of the machine can revolve the shaft to lift the plows 9.

The usual axle 11 is carried by the frame 1 upon which the side wheel 12 is mounted.

The rear portion of the frame 1 is extended as at 13 and carries thereon a bearing block 14 in which is pivotally mounted the standard 15 carrying at its lower end the wheel 16 for the support of the rear of the plow.

The device embodying this invention comprises a bracket structure indicated generally by the numeral 17. This bracket is of a flat steel bar bent intermediate its ends at the points 18 to set up the vertical upper portion 19, the obtusely angled intermediate portion 20 and the horizontal terminal lower portion 21. Secured by means of the rivets 22 to the back of the bar 17 and extending throughout the length thereof is a steel strap 23 which is also bent to set up upper, intermediate and lower portions 24, 25 and 26 respectively. The intermediate portion 25 of the strap 23 is of greater length than the intermediate portion 20 of the bar 17 and extends in such a manner as to space the upper portion 24 from the upper portion 19 as is shown. The lower portion 26 of the strap 23 is also of greater length than the lower portion 21 of the bar 17 and extends beyond the terminal end thereof, and secured to the upper side of the lower portion 21 of the bar 17 is a second short strap 27 which is also of greater length than the portion 21 extending beyond the end of the same and overlying and spaced from the extended end of the portion 26 setting up the bifurcation 28.

Secured at its central portion by means of the bolt 29, between the extended ends of the portion 26 and member 27, is a substantially U-shaped yoke member 30, the terminal ends of which are apertured to receive a draw bolt 31.

Secured to the extended ends of the portion 26 and the member 27, also by the bolt 29, is a second U-shaped yoke member 32 which is arranged in a position opposite that assumed by the yoke 30 and extended in the opposite direction.

When the device is placed in use, the bolts 33 which extend through the aligned apertures 34 formed through the portions 19 and 24 of the bar 17 and strap 23, are loosened and removed, and the device is so placed upon one of the beams 5, as to position the portions one on either side of the beam whereupon the bolts 33 are replaced one above and the other beneath the beam and the nuts thereof threaded thereon to draw the members 19 and 24 together to bind the beam 5 therebetween. As shown the beam selected is that one which extends farthest to the rear of the implement which is also the one near the inside of the implement and when the bracket is thus attached to the beam a portion thereof or horizontal section, will extend laterally from the implement. The device will then assume the position shown in Figures 1 and 2 and the yoke 30 will be directed toward the rear of the implement and the yoke 32 will be directed toward the front thereof.

When the device is thus secured in position upon the plow beam 5, a chain 33 is secured at one end to the forwardly directed yoke 32 and the other end of the chain is carried to the head 6 of the implement where it is attached as at 34 thereto. The clevis 36 of a walking plow indicated generally by the numeral 37 is then positioned between the ends of the arms of the yoke 30 and the bolt 31 passed therethrough and through the clevis to secure the walking plow to the attachment. As is clearly shown in Figure 2 when the walking plow is thus connected to the sulky plow by means of the attachment embodying this invention it will assume the same position with relation to the plows carried by the sulky as the individual plows bear to one another and will be in staggered relation therewith. When the sulky plow is moved forward, the walking plow 36 will be drawn therewith and owing to the bracing chain 33 extending between the attachment and the head of the sulky plow the attachment is prevented from being twisted toward the rear of the implement.

From the foregoing description it will be readily seen that there has been provided a very unique and novel means for attaching a walking plow to a sulky plow in a desirable manner, which means is strong and durable, inexpensive to manufacture and easily and quickly attached.

Having thus described my invention what I claim is:—

1. A device for coupling a walking plow to a sulky plow, comprising a bar member having a vertical and a horizontal portion, means for securing said vertical portion to a beam of said sulky plow, and pivoted means carried at the free end of said horizontal portion for setting up a pivotal connection with the beam of a walking plow.

2. A device for coupling a walking plow to a sulky plow, comprising a bar member having a vertical and a horizontal portion, means for securing said vertical portion to a beam of said sulky plow, means carried at the free end of said horizontal portion for setting up a pivotal connection with the beam of a walking plow, and means connecting the free end of said horizontal portion with the forward part of the sulky plow for assisting to maintain said member in proper position.

3. A device for coupling a walking plow to a sulky plow, comprising a bar member having a vertical upper portion, an intermediate portion and a horizontal lower portion, a strap member of greater length than said member and lying against the lower and intermediate portions and spaced from and lying parallel with said upper portion, means for securing said upper bar portion and the spaced strap portion together, each on one side of a plow beam of said sulky plow, and a connecting member pivotally carried upon the free end of said horizontal portion for attachment to the beam of a walking plow.

4. In a coupling device for use in connection with a sulky plow and a walking plow, a bar member having a vertical upper portion, an intermediate portion and a lower horizontal portion, a strap member of greater length than said bar member and lying against the lower and intermediate portions and spaced from and lying parallel with said upper portion, means for securing said upper bar portion and the spaced strap portion together, each on one side of a plow beam of said sulky plow, a pair of oppositely directed yokes pivotally secured at the free end of said horizontal portion, one thereof being adapted for connection to a walking plow, and means for connecting said other yoke to the forward part of the sulky plow for bracing the device.

In testimony whereof, I affix my signature hereto.

MARTIN EGGUM.